US009253250B2

(12) United States Patent
Asati et al.

(10) Patent No.: US 9,253,250 B2
(45) Date of Patent: Feb. 2, 2016

(54) LOCAL REROUTE PROTECTION FOR MULTICAST MULTIPROTOCOL LABEL SWITCHING

(71) Applicant: Cisco Technology, Inc., San Jose, CA (US)

(72) Inventors: Rajiv Asati, Morrisville, NC (US); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 399 days.

(21) Appl. No.: 13/839,764

(22) Filed: Mar. 15, 2013

(65) Prior Publication Data

US 2014/0280711 A1   Sep. 18, 2014

(51) Int. Cl.
| | | |
|---|---|---|
| H04L 29/08 | (2006.01) |
| H04L 12/703 | (2013.01) |
| H04L 12/761 | (2013.01) |
| H04L 12/707 | (2013.01) |
| H04L 12/753 | (2013.01) |
| H04L 12/723 | (2013.01) |

(52) U.S. Cl.
CPC ............... *H04L 67/10* (2013.01); *H04L 45/28* (2013.01); *H04L 45/16* (2013.01); *H04L 45/22* (2013.01); *H04L 45/48* (2013.01); *H04L 45/50* (2013.01)

(58) Field of Classification Search
CPC ......... H04L 67/10; H04L 45/28; H04L 45/16; H04L 45/22; H04L 45/50; H04L 45/48
See application file for complete search history.

(56) References Cited

U.S. PATENT DOCUMENTS

| 7,675,860 | B2 | 3/2010 | Vasseur et al. |
| 7,701,881 | B1 | 4/2010 | Sankaran |
| 7,835,378 | B2 | 11/2010 | Wijnands et al. |
| 7,848,224 | B2 | 12/2010 | Bryant et al. |
| 7,899,049 | B2 | 3/2011 | Raj et al. |
| 8,004,960 | B2 | 8/2011 | Raj |
| 8,102,775 | B2 | 1/2012 | Thubert |
| 2011/0058567 | A1 | 3/2011 | Wijnands et al. |
| 2011/0134802 | A1 | 6/2011 | Rajagopalan et al. |

OTHER PUBLICATIONS

Atlas et al. ("An Architecture for Multicast Protection Using Maximally Redundant Trees," draft-atlas-rtgwg-mrt-mc-arch-1), Feb. 25, 2013, IETF.*
Atlas et al., "An Architecture for Multicast Protection Using Maximally Redundant Trees draft-atlas-rtgwg-mrt-mc-arch-01.txt", Internet Engineering Task Force, IETF; Standardworkingdraft, Internet Society (ISOC), Feb. 25, 2013, pp. 1-29, XP015092397.

(Continued)

*Primary Examiner* — Jae Y Lee
(74) *Attorney, Agent, or Firm* — Parker Ibrahim & Berg LLC; James M. Behmke; Stephen D. LeBarron

(57) ABSTRACT

In one embodiment, a merge process can determine a primary tree among nodes in a communication network, determine a backup tree for a protected segment of the primary tree, the backup tree having at least a portion of overlap with the primary tree, and stitch the backup tree to the primary tree for each node of the portion of overlap such that when a message is transmitted for a group according to the backup tree, each node of the portion of overlap receives a single instance of the message of the group.

17 Claims, 12 Drawing Sheets

(56) References Cited

OTHER PUBLICATIONS

Wijnands et al., "mLDP Node Protection draft-wijnands-mpls-mldp-node-protection-02.txt", Internet Engineering Task Force, IETF, Standardworkingdraft, Internet Society (ISOC), Dec. 20, 2012, pp. 1-17, XP015089188.

IJsbrand Wijnand Cisco Systems et al., "mLDP Extensions for Multi Topology Routing draft-iwijnand-mpls-mldp-multi-topology-02.txt", Internet Engineering Task Force, IETF, Standardworkingdraft, Internet Society (ISOC), Jul. 2, 2012, pp. 1-11, XP015083653.

International Search Report and Written Opinion mailed Jun. 26, 2014, in corresponding PCT Application No. PCT/US2014/021141.

Aggarwal, et al., "Extensions to Resource Reservation Protocol—Traffic Engineering (RSVP-TE) for Point-to-Multipoint TE Label Switched Paths (LSPs)", Network Working Group, Request for Comments 4875, May 2007, 53 pages, The IETF Trust.

\* cited by examiner

US 9,253,250 B2

LOCAL REROUTE PROTECTION FOR MULTICAST MULTIPROTOCOL LABEL SWITCHING

TECHNICAL FIELD

The present disclosure relates generally to communication networks, and, more particularly, to local reroute protection for multicast multiprotocol label switching (MPLS).

BACKGROUND

Internet Protocol (IP) communications such as multicast transmission, allow a host to send data (e.g., packets) to a subset of various nodes as a group transmission. Multicast transmission is particularly useful for applications that steam audio and video (e.g., IP television or "IPTV") since multicast transmission conserves bandwidth by minimizing duplication of data. Multicast transmission can be employed using various network routing protocols such as, for example, multi-protocol label switching (MPLS). With respect to MPLS networks, avoidance of packet loss (due to various failures in a network) is imperative to prevent degradation of real-time services (e.g., streaming video, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a merge process can determine a primary tree among nodes in a communication network, determine a backup tree for a protected segment of the primary tree, the backup tree having at least a portion of overlap with the primary tree, and stitch the backup tree to the primary tree for each node of the portion of overlap such that when a message is transmitted for a group according to the backup tree, each node of the portion of overlap receives a single instance of the message of the group

Description

A communication network comprises geographically distributed nodes (e.g., devices of a distributed data center or end-client devices such as personal computers and workstations, or other devices) interconnected by communication links for transporting data between end nodes. Various types of network are available and can include, for example, local area networks (LANs), wide area networks (WANs), etc. In addition, each of these various types of networks can support various communication technologies such as multicast, and non-multicast (e.g., unicast) communication. Each of these networks can connect the nodes over dedicated private communication links, or dispersed nodes over long-distance communications links such as common carrier telephone lines, optical lightpaths, synchronous optical networks (SONET), synchronous digital hierarchy (SDH) links, and others.

Figure 1:
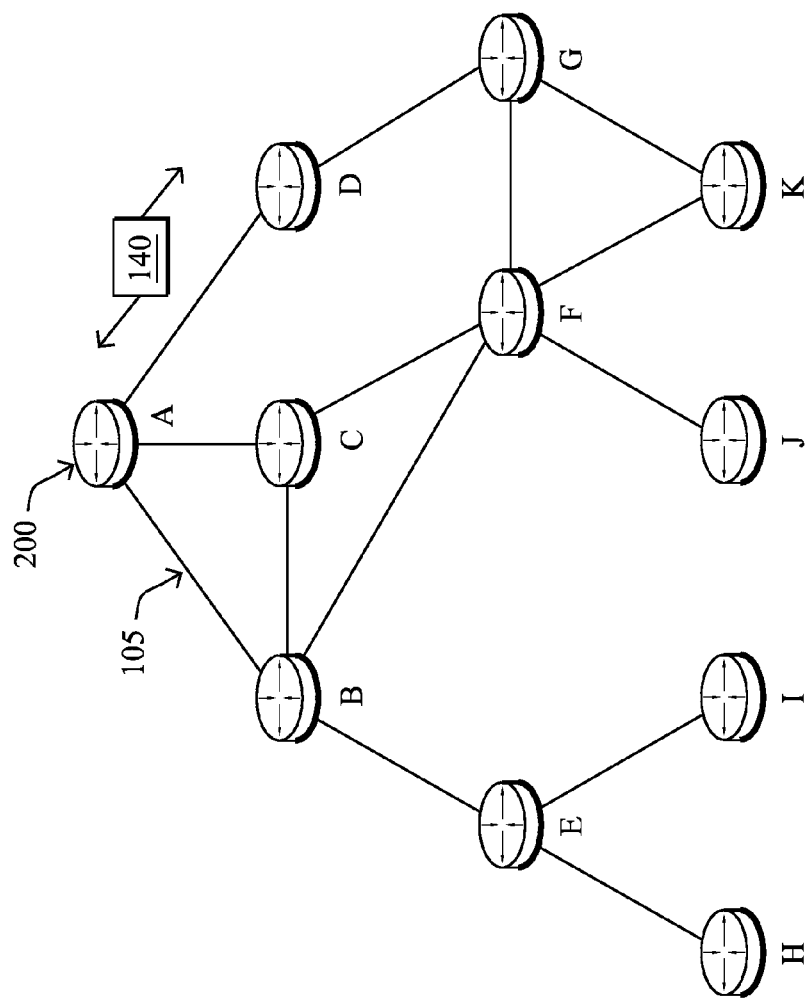
FIG. 1 illustrates an example communication network.

FIG. 1 is a schematic block diagram of an example communication network 100 illustratively comprising nodes/devices 200 (e.g., labeled as shown, "A"–"K," and described in FIG. 2 below) interconnected by various methods of communication. For instance, the links 105 may be wired links or shared media (e.g., wireless links, power-line communication (PLC) links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "head" node A, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
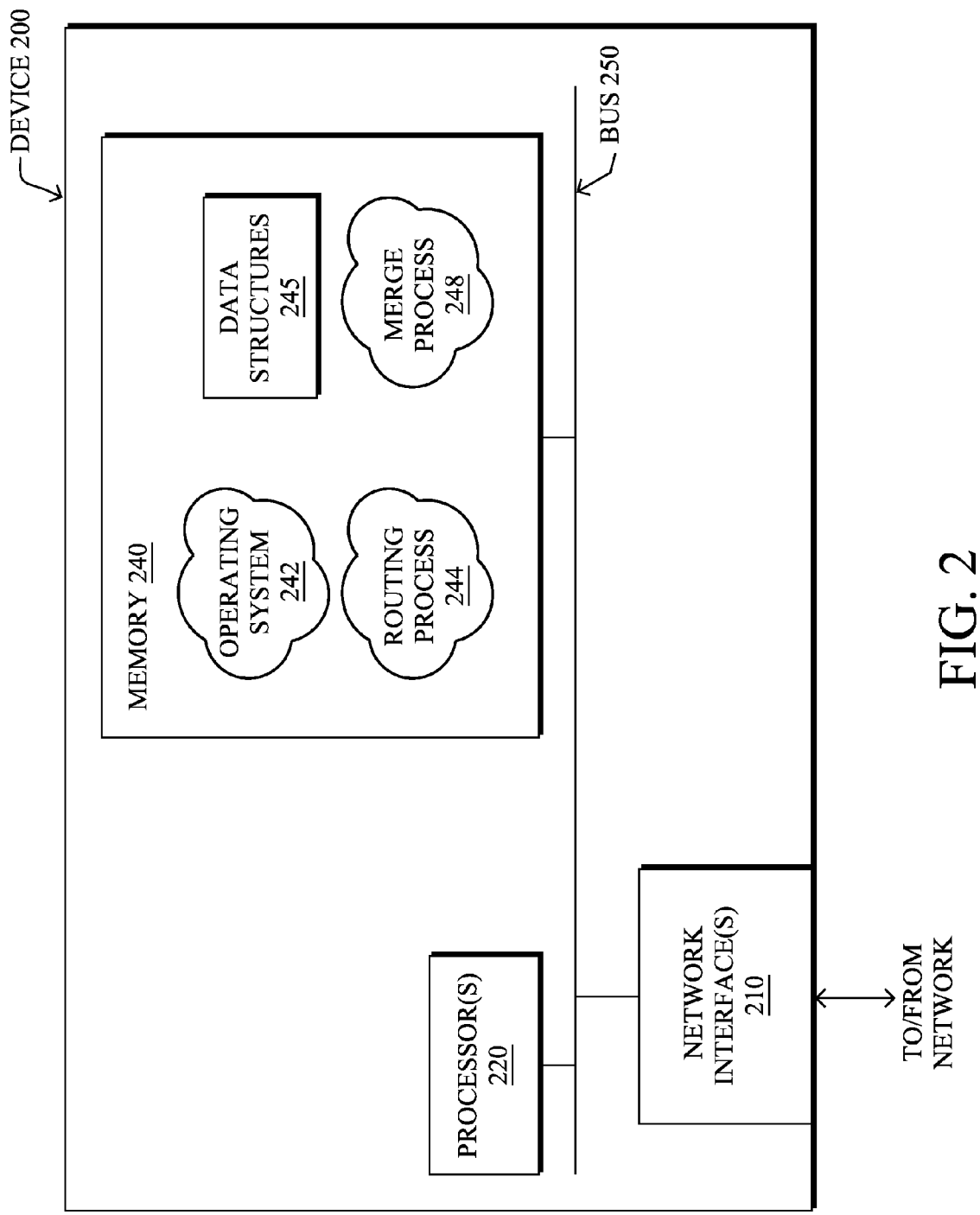
FIG. 2 illustrates an example network device/node.

FIG. 2 is a schematic block diagram of a simplified example device 200 that may be used with one or more embodiments described herein. For example, example device 200 can be any of the nodes shown in FIG. 1, and can include a router, a relay, a switch, etc.

Device 200 may comprise one or more network interfaces 210 (e.g., wired, wireless, etc.), at least one processor 220, and a memory 240 interconnected by a system bus 250. These network interface(s) 210 comprise the mechanical, electrical, and signaling circuitry for communicating data over network 100. Network interfaces 210 may be configured to transmit and/or receive data using a variety of different communication protocols. Note that each device may include two different types of network connections 210, e.g., wireless and wired/physical connections, and that the view herein is merely for illustration.

Memory 240 comprises a plurality of storage locations that are addressable by the processor 220 and the network interfaces 210 for storing software programs and data structures associated with the embodiments described herein. Processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and a merge process 248, as described herein. Note that while processes 244 and 248 are shown in centralized memory 240, additional embodiments provide for either of the processes to be specifically operated within the network interfaces 210.

Note further that while both processes 244 and 248 are shown as installed in a memory 240, and therefore being implemented in software, these processes could be implemented in any of hardware (e.g., electronic circuitry), firmware, software, or a combination thereof. Alternatively, these processes may be configured on a storage medium for subsequent loading into memory 240. The storage medium can include a computer-readable medium encoded with a computer program, and can be any conventional storage medium that stores the processes thereon in tangible form. Examples of storage media include a floppy disk, a compact disk, a magnetic tape, a read only memory, an optical storage media, universal serial bus (USB) flash drive, etc. Alternatively, storage media can include a random access memory, or other type of electronic storage, located on a remote storage system and coupled to processor 220, via network interface 210.

As will be apparent to those skilled in the art other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, communication networks can employ multicast routing techniques via, for example, multi-protocol label switching (MPLS) protocols (e.g., routing process 244). As discussed, with respect to MPLS networks, avoidance of packet loss (due to various failures in a network) is imperative to prevent degradation of real-time services (e.g., streaming video, etc.).

One example technique to avoid packet loss is MPLS Fast ReRoute (FRR) tunneling, which can minimize data loss during a network link/node failure. FRR tunnels can be used to reroute data when a link or node is unreachable (e.g., a failure occurs). According to FRR tunneling techniques, a backup path or tunnel such as a label switched path (LSP) is created (e.g., via a Resource reSerVation Protocol Traffic Engineering (RSVP-TE) point-to-point (P2P) LSP, a loop-free alternate (LFA) P2P LSP, etc.) in order to bypass a failed link or node (e.g., a protected path). However, these conventional FRR tunneling techniques for multicast networks, however, may use unnecessary network bandwidth since the same data can be sent over the same link twice for portions of the backup path that overlap portions of the primary path. For example, when portions of the backup path overlap portions of the primary path, a duplicate message for both the primary path and the backup path may be sent on the same link thereby using unnecessary network bandwidth.

The techniques herein describe avoidance of packet loss in MPLS networks using FRR backup paths or backup trees. Particularly, these techniques provide optimal local protection technique for building the backup path for Multicast MPLS FRR and prevent double bandwidth utilization (not just double-booking) requirements for either link or node protection due to a stitching (e.g., merging) together primary and backup paths. These techniques also include additional logic for multicast label distribution protocol (mLDP) based paths to avoid various corner issues before FRR and before re-optimization. In addition, these techniques provide control plane enhancement (mLDP or RSVP) and data plane enhancements, for merging a primary and backup path to provide a super set tree that is used during FRR for link and node protection. In turn, the techniques enable a point of local repair (PLR) node to move from a backup path to the primary path and cleanup the backup path, even if path setup is controlled by a different node (e.g., a merge point node).

Illustratively, the techniques described herein may be performed by hardware, software, and/or firmware, such as in accordance with the "merge" process 248, which may contain computer executable instructions executed by the processor 220 (or independent processor of interfaces 210) to perform functions relating to the techniques described herein, e.g., in conjunction with routing process 244. For example, the techniques herein may be treated as extensions or attributes for conventional protocols, such as the various MPLS protocols or routing protocols, and as such, may be processed by similar components understood in the art that execute those protocols, accordingly.

Specifically, according to one or more embodiments of the disclosure as described in detail below, the techniques provide local protection through various distinct aspects including: construction of a backup path (P2MP LSP) for the primary path (P2MP LSP) to perform local link/node protection in a manner that stitches the backup path with primary path; forwarding the traffic only using the backup path (and not using the primary path branch sharing the path with backup path) or vice-versa during FRR→referred to as merging logic; and employing a switch-before-break algorithm (in case of mLDP) in addition to make-before-break.

For example, the techniques herein may include a new attribute (e.g., mLDP Opaque type-length-value (TLV) or RSVP Object) that identifies (i) a link/node being protected, and (ii) a forwarding equivalent class (FEC) of the original path being protected during the signaling of the backup path setup. In turn, the attribute can associate the backup path and the primary path, such as for stitching the paths as described below. Notably, as also discussed herein, a node (e.g., a router) that reroutes or redirects data around the failure is typically called a point of local repair (PLR), a node that receives the rerouted data is called a merge point (MP). Further, when data is routed according to the backup path or tunnel, the data typically retains its original label stack during the reroute (e.g., FRR) since the PLR typically pushes a backup tunnel label on top of the data (e.g., the original label stack), while the MP receives the traffic on the original label due to Penultimate Hop Popping (PHP).

When the primary path is associated with the backup path at the PLR node and the MP node, the PLR node can forward data (i.e., traffic) on either of the primary path or the backup path (e.g., as part of the merge process/services 244). In some embodiments, as discussed herein, the PLR can instruct each label switching router (LSR) on the backup path or backup path between the PLR node and the MP node to merge (i.e., inherit) downstream label mapping of the primary path with that of the backup path such that the backup path is a super set of all the label mappings (for both backup or primary paths). For example, a node can merge the primary tree with the backup tree as follows: With respect to the node, if primary tree had a label forwarding information based (LFIB)/MPLS forwarding entry of 30/iif1 (inbound interface)→40/oif1 (outbound interface), the backup tree can merge the primary tree entry with a backup path as follows: 32/iff1→40/oif1, 43/oif2. Thus, the node can retain the outbound interface of the primary tree (oif1) as well as an additional backup path (oif2). This concept is further described below.

Operatively, the PLR node knows which path is the primary path and which is the backup path. Once the PLR determines that a protected path (e.g., a link, a path segment, a node, etc.) fails, the PLR can commence FRR to redirect traffic from the primary path to the backup path. Notably, this FRR will not lead to any packet loss on the primary path since the backup path is a super set of both the primary path and the backup path. Additionally, this FRR prevents duplication of data because the PLR node stops forwarding over the primary path branch that shares a path with backup path.

After FRR, a headend node "root" (e.g., a headend router for RSVP-TE) or the merge point router (MP) (e.g., Multi-point Extensions to Label Distribution Protocol (mLDP)) can recalculate and/or converge to determine a new best path to setup a primary path such that traffic is no longer transmitted on the backup path. The new path determination could be done statically or dynamically (interior gateway protocol (IGP) backup, loop free alternatives (LFAs), etc.). Particularly, for RSVP, the PLR node can control both forwarding and LSP/path setup before and during re-optimization. Accordingly, the PLR node can delete the backup path (or change its path) after it no longer forwards the traffic on the backup path.

With respect to mLDP, the PLR node typically controls the forwarding, while the MP node controls the path setup. As discussed herein, the MP node can employ merging logic for the portion between the backup path and primary path to stitch the backup path to the primary path for each node of overlap between the two paths such that each node of the portion of overlap receives a single instance of a message (e.g., a data packet).

Figure 3A:
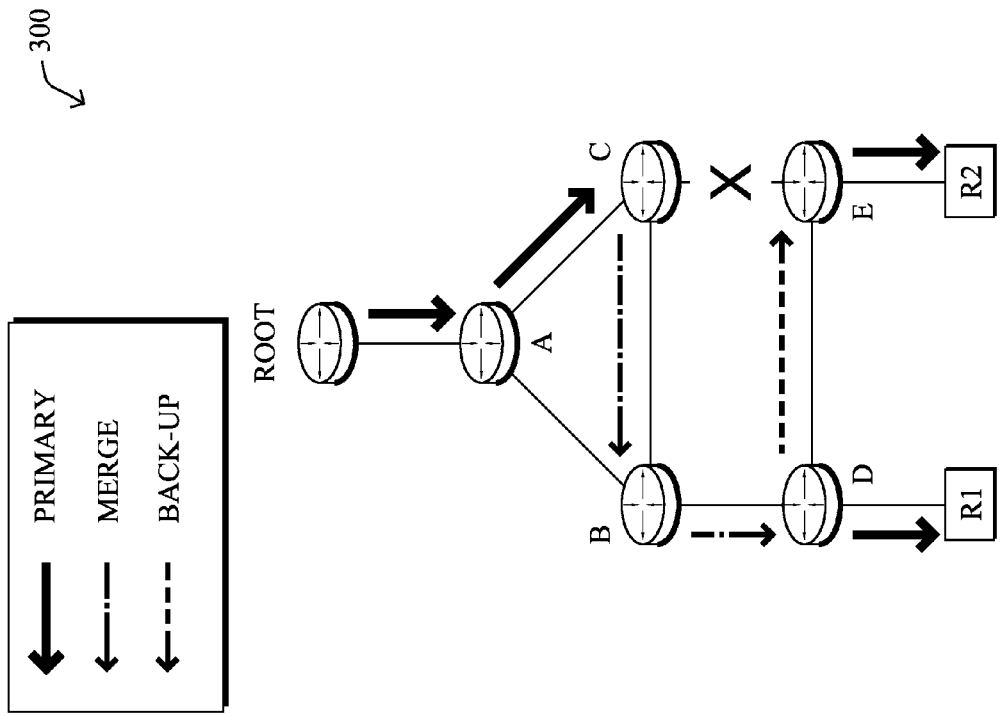
FIGS. 3A-3B illustrate an example view of a communication network with respect to merge processes disclosed herein.
Figure 3B:
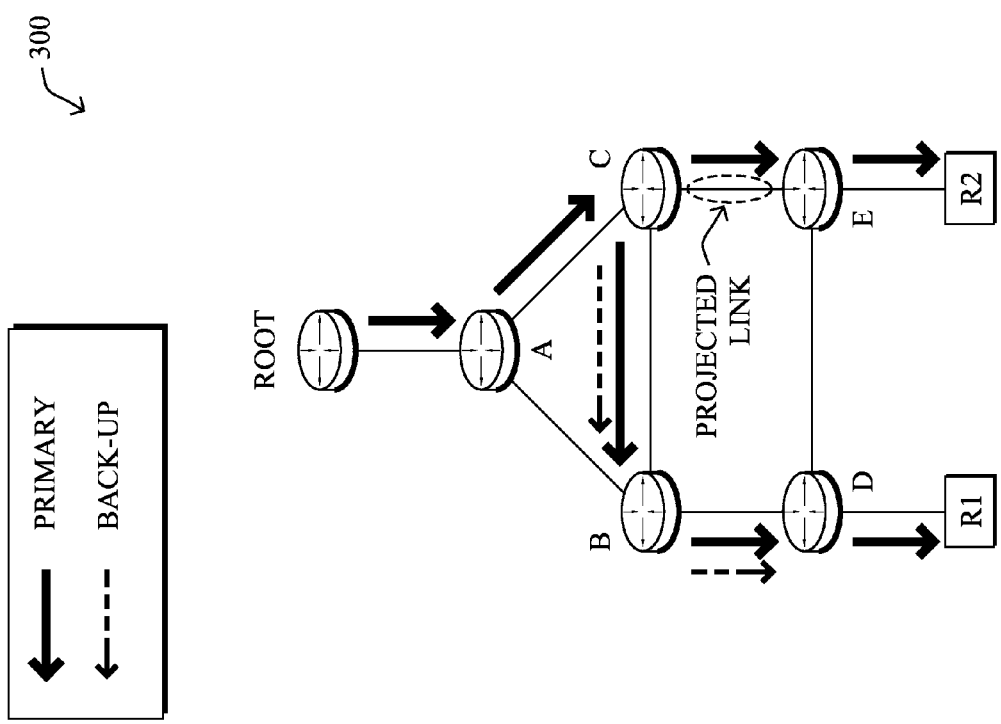

As an illustration, FIGS. 3A-3B show an example view of a communication network (i.e., network 300) with respect to merge processes disclosed herein. Particularly, FIGS. 3A-3B illustrate merge techniques with respect to a primary path and a backup path sharing at least a portion of a same path from a point of local repair (PLR).

Specifically, FIG. 3A shows a network 300 having various nodes (i.e., "ROOT", A"-"E") and receivers (i.e., "R1" and "R2"). As shown, receiver R1 joins the path to ROOT via nodes E, C, D; R2 joins the path to the ROOT via nodes D, B, C, A; the link between nodes C and E (link C-E) is protected; node C is the point of local repair (PLR); and node E is the merge point (MP). With respect to a backup path, node E can initiate building a point to multipoint (P2MP) backup path with node C being the local root that bypasses the protected link C-E. For example, nodes C and E (depending upon protocol) can setup a backup path for the protected link C-E, where the backup path (or portion thereof) is shared with the primary path, such as the segment directed toward receiver R1 (i.e., an overlapping path from nodes C, B, D). In this case, a forwarding equivalent class (FEC) of each path can identify the respective paths as either backup or primary. In this fashion, each node along the respective paths can determine when it serves as a primary node or a backup node. For example, node D is a primary node that forwards messages according to a primary path (e.g., to route messages destined for receiver R1) and a backup node that forwards messages according to a backup path (e.g., to route messages destined for receiver R2) in its database. Notably, the PLR node (e.g., a root of the backup path around node C), has total knowledge of the primary and backup path sharing the same path. Node C, having total knowledge of the primary and backup path, can trigger a notification down the backup path to indicate that the primary and backup share the same path (e.g., overlap) relative to the PLR node. Merging logic can then be applied on each node (e.g., hop) downstream (e.g. nodes B, D, E). This notification is eventually received by node E, which can also apply the merging logic.

FIG. 3B illustrates the communication network 300 of FIG. 3A when the protected path (i.e., the link between nodes C-E) fails. Once the protected link fails, FRR is applied. According to the FRR described herein, node C (i.e., the PLR node) begins to forward data on the backup path and stops forwarding on the primary path. As shown, for portions of overlap, data is forwarded according to the "merge path", which represents the overlapping portion of the backup path for the protected link and the primary path for receiver R1. In this fashion, nodes B and C do not receive duplicate data (e.g., packets) since node C stopped forwarding on the primary path. Instead, node D can forward traffic it receives from the backup path to its downstream receivers on the primary path, and along the backup path to node E.

In sum, one or more nodes in network 300 can determine a primary tree. Node C, which is a PLR node, can determine a backup tree for a protected segment of the primary tree (e.g., a protected link C-E), and node C can stitch the backup tree to the primary tree for each node of a portion of overlap (e.g., link C-B, link B-D), such that when a message is transmitted for a group according to the backup (e.g., a message destined for receiver R2), each node of the portion of overlap receives a single instance of the message of the group.

In some embodiments, node E can subsequently re-optimize (e.g., determine and setup a new primary path), performing a make-before break or "MBB") for the new primary path, and receive traffic on the new primary path. For example, node E can perform checks for the following scenarios as follows:

1. (New primary path!=backup path) OR ((New primary path==backup path) AND (Merging==FALSE)). If the check is TRUE, then the MP node can apply make-before-break procedures whereby the MP node can, for example, include an 'MBB Request' in the Label Mapping of the new primary path. Once the MP node receives an acknowledgement (e.g., 'MBB Ack') from the upstream/RPF neighbor, the MP node can activate the new path and deactivate (e.g., set the drop bit for) the old primary path (backup and old primary) according to MBB procedures. At this point, the MP node can also remove the backup path.
2. (New primary path==backup path) AND (Merging==TRUE). If this check is TRUE, node E can confirm whether traffic is being forwarded (e.g., by the PLR node C) over the backup path (e.g., the superset or merging path), which is expected during the FRR after the failure, or if the traffic is being forwarded over the primary path, which is expected due to a better path becoming available, with no failure present.

In both scenarios, node E can query node C to determine if traffic is forwarded over backup path or not. Accordingly, the MBB status value, the Switch-Before-Break (SBB) Request and ACK (Acknowledgment), provide a mechanism to ensure that no data is lost when switching from various primary and/or backup paths. For example, node E can include the SBB request in the label mapping when it sets up the new primary path. This request can further be forwarded all the way up the path until reaching the root of the backup path—here, node C.

Operatively, if node C (e.g., the PLR node) sends traffic over the backup path, it also sends a notification including an SBB Ack down the primary path and starts a timer to switch from the backup path to the primary path upon time expiration. This timer value can be configurable. Preferably, the timer can be in the order of a few seconds to a minute. When node E receives the SBB Ack, it will immediately activate the new primary path (e.g., remove the drop property of the old path), and forward according to the backup path. As discussed above, node C forwards data (e.g., packets) on a single path at a given time and thus, no data is lost or even duplicated when node E switches from between paths. Node E receives the delay value (e.g., via the SBB Ack) from node C. Node E uses the delay value to determine when to withdraw the backup path. In some embodiments, node E can account for a robustness value to prevent withdrawing the backup path too early. Notably, if node C (e.g., the PLR node) is not forwarding on the backup path, it replies with a normal MBB Ack, which informs node E that it can initiate a normal MBB switchover procedure, as discussed above.

Figure 4A:
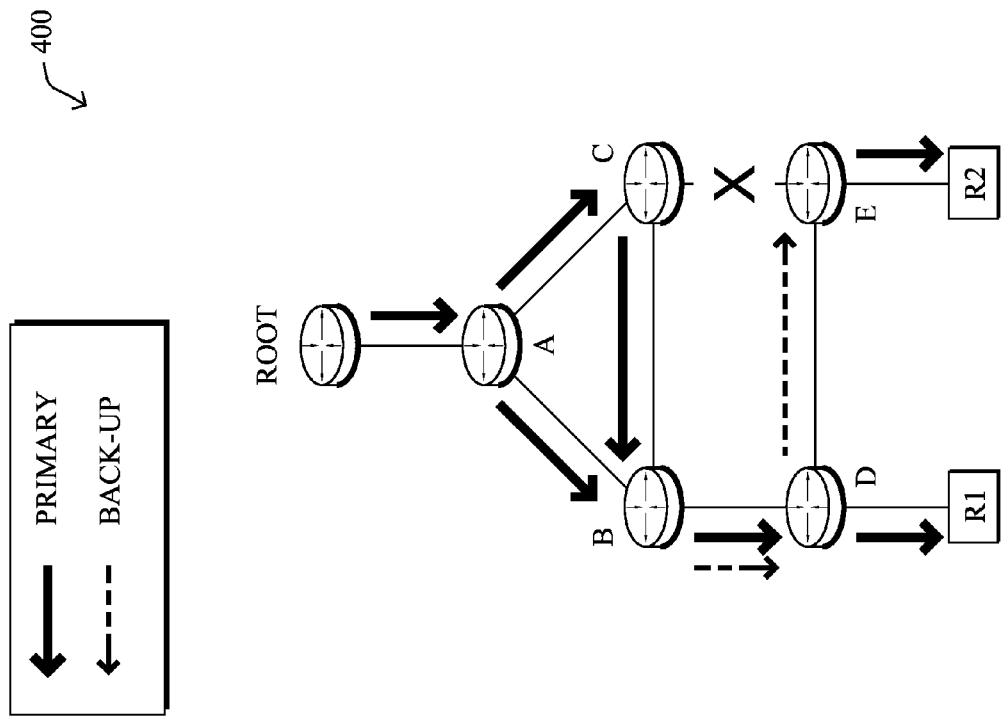
FIGS. 4A-4B illustrate another example view of a communication network with respect to merge processes disclosed herein.
Figure 4B:
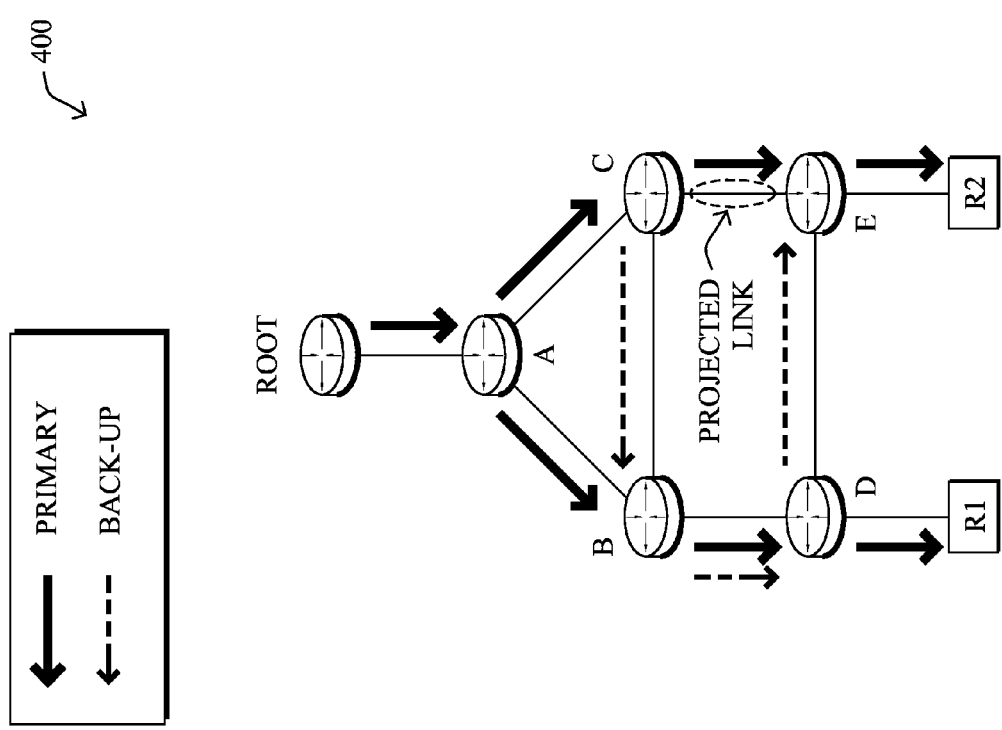

FIGS. 4A-4B illustrate another example view of a communication network (i.e., network 400) with respect to merge processes disclosed herein. Particularly, FIGS. 4A-4B illustrate message routing when a protected path (i.e., a link between nodes C-E) fails and message routing in response thereto. Collectively, FIGS. 4A-4B illustrate non applicability of the merge techniques discussed above since there is no overlap or shared path between a primary path and a backup path with respect to a PLR.

FIG. 4A, similar to network 300 discussed above, shows network 400 having various nodes (i.e., "ROOT", A"-"E") and receivers (i.e., "R1" and "R2"). As shown, receiver R1 joins a primary path to ROOT via nodes D, B, A; receiver R2 joins a primary path to ROOT via nodes E, C, A. As shown, the link between node C and node E is protected with node E being a merge point (MP). Further, node C becomes the PLR. As discussed above with respect to communication network 300, node E can initiate a backup path (e.g., a P2MP backup path) with node C being the local 'root" to bypass the protected C-E link. However, the primary path and the backup path do not share a same path to the PLR. That is, node B determines that the primary path and the backup path have different upstream paths (e.g., RPF neighbors). Thus, merging logic is not applied. Instead, node B triggers a notification down the path that negates merging logic (e.g., merge process 248) and thus, a superset is not created by nodes on the backup tree. Notably, this may also happen when router B converged from C to A after a routing convergence event. Router E (MP), upon receiving the negative merge Notification, will apply normal MBB procedures when switching to a new primary path.

FIG. 4B depicts the communication network 400 of FIG. 4A when the protected path (i.e., the link between nodes C-E) fails. Once the protected path fails, there is a temporary double packet forwarding on the B-D link until node E moves to the new primary tree and withdraws the backup tree (e.g., using the techniques described above). However, node E may be aware of double utilization and can perform the re-optimization, and MBB to the new primary tree quicker than conventional re-optimization, thereby reducing the time-window in which the B-D link carries extra traffic.

Figure 5A:
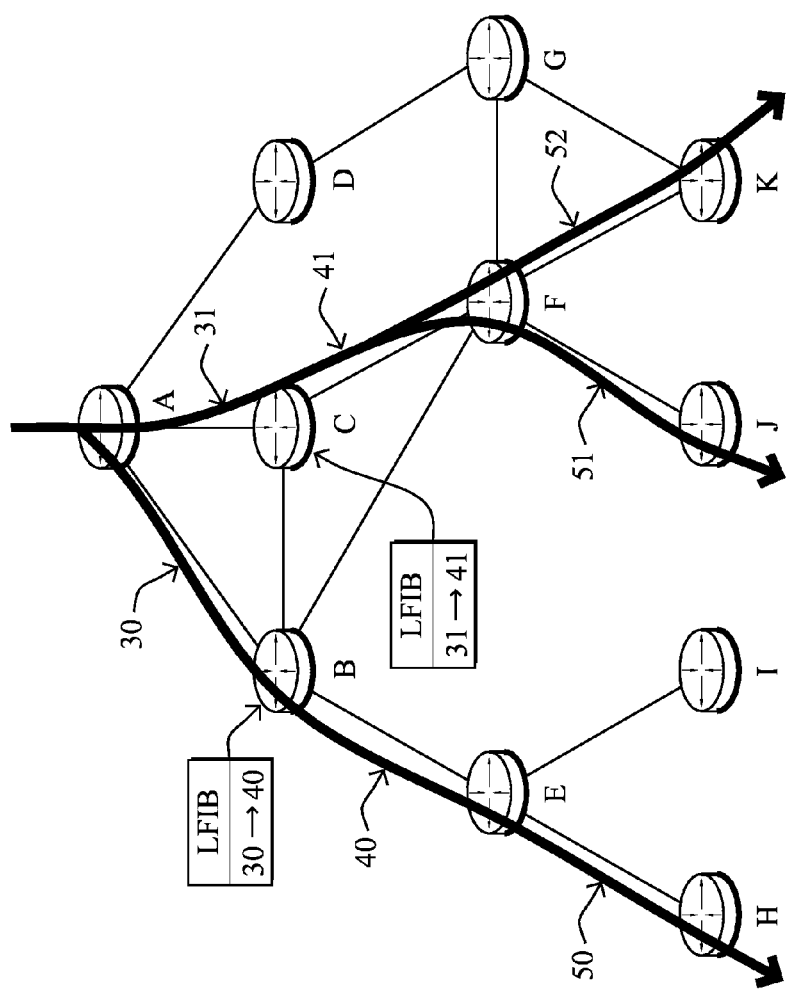
FIGS. 5A-5C illustrate an example view of the communication network of FIG. 1 with respect to merge processes for a protected link.
Figure 5B:
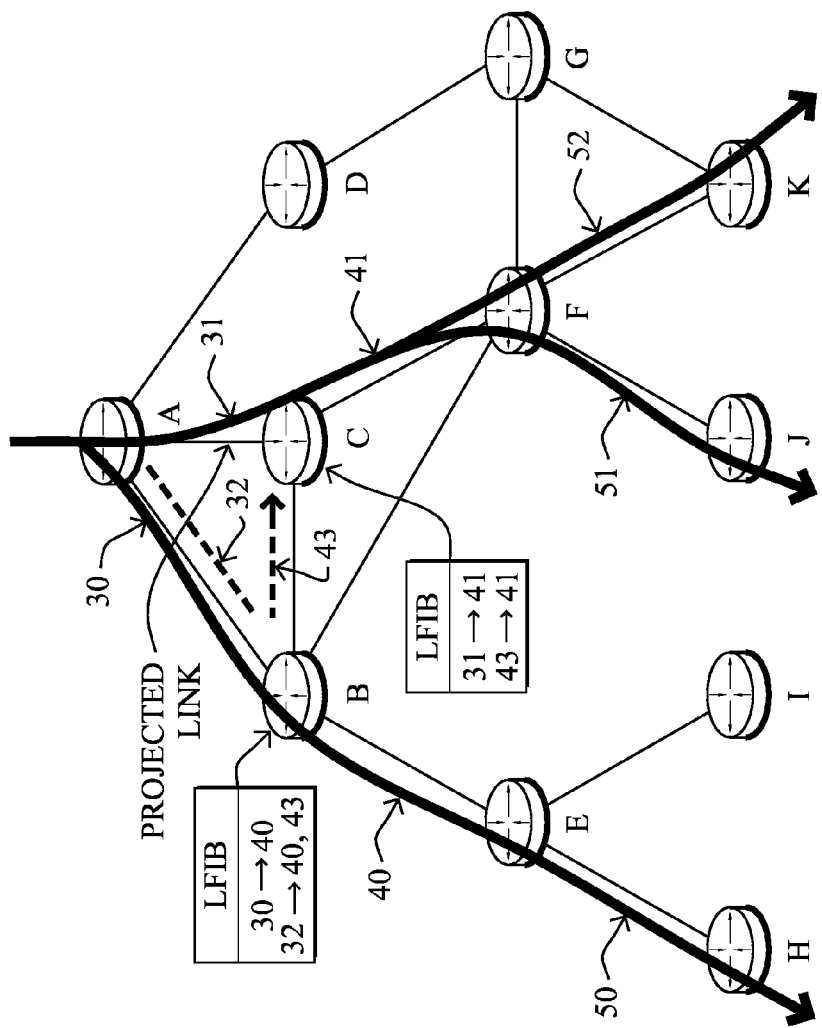
Figure 5C:
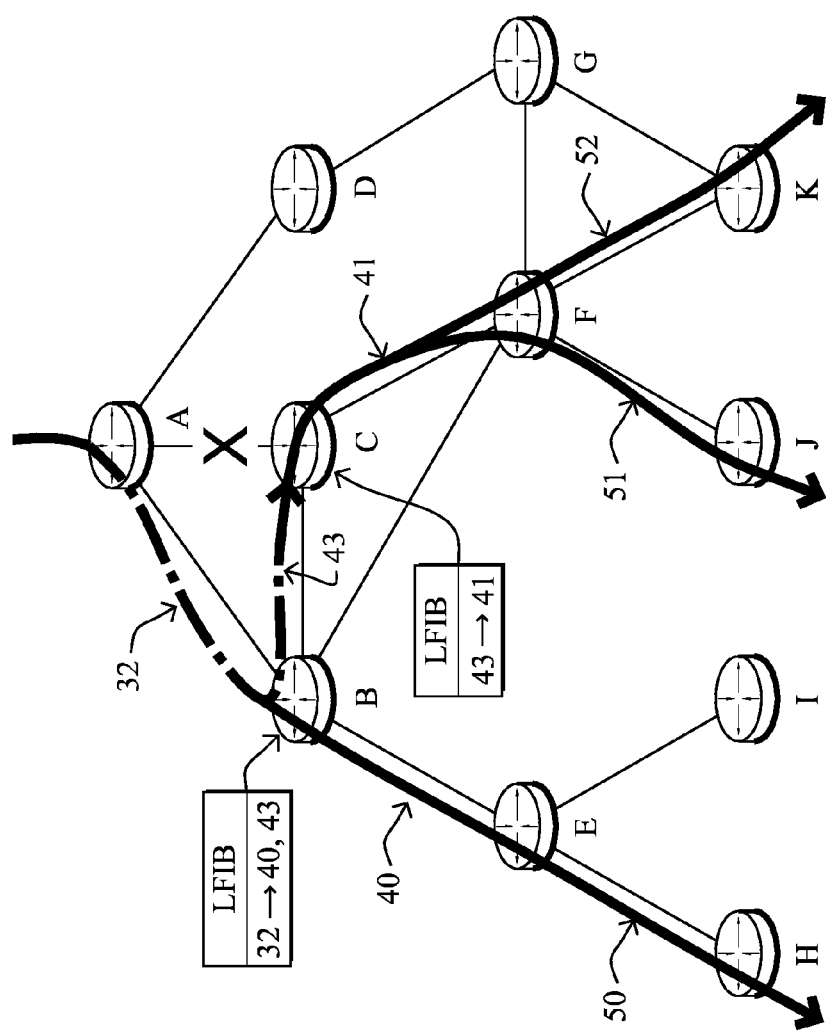

As a further example of the techniques described herein, FIGS. 5A-5C illustrate an example view of the communication network of FIG. 1 with respect to merge processes for a protected link. In particular, FIG. 5A illustrates forwarding data packets (e.g., messages) amongst nodes in the communication network of FIG. 1 (i.e., network 100). As discussed above, network 100 includes various nodes/devices (e.g. labeled as shown, "A"-"K") interconnected by various methods of communication (e.g., links). Data packets are sent amongst the various nodes in network 100 via, for example, tunnels (e.g., a P2MP tunnel, etc.).

As understood by those skilled in the art, the tunnels between each node can comprise label switched paths (LSPs). For example, node A forwards data packets to node B on label 30 and to node C on label 31. Node B, in turn, forwards data packets to node E on label 40, and node C forwards data packets to node F on label 41. In this fashion, labels are switched as data packets are forwarded onward toward respective destinations. Notably, the label forwarding information can be stored at each of the various nodes via, for example, a label forwarding information base (LFIB). Specifically, node B has a LFIB definition that maps incoming data packets having label 30 to label 40 (i.e., 30iif1→40oif1) and thus forwards incoming data packets using label 30 as outgoing data packets using label 40 to node E. Similarly, node C has an LFIB definition that maps incoming data packets having label 31 to label 41 and thus forwards outgoing data packets mapped to label 41 to node F. Notably, node F, as a branching point of the P2MP LSP, has an LFIB that maps incoming label 41 from node C into outgoing labels 51 (oif1) and 52 (oif2) to nodes J and K, respectively.

FIG. 5B illustrates the communication network 100 having a backup path that bypasses a protected link A-C. As discussed above, node A normally forwards to nodes B and C using label 30 and 31, respectively. To protect the link between node A and node C, node A can set up an n-hop backup tunnel via B (i.e., via nodes A-B-C). Node A conveys to node B and node C (e.g., via a Resource Reservation Protocol (RSVP) message) that the backup tunnel should be stitched to the primary tunnel. In turn, node B creates an additional LFIB entry with incoming label 32 mapped to both outgoing label 40 and 43, and node C creates an additional LFIB entry with incoming label 43 mapped to outgoing label 41. Notably, node A becomes a point of local repair (PLR) node, node B is a branch point (BP) node and node C is a merge point (MP) node. Typically, the backup tunnel destination (e.g., a tail-end node) is a MP node. In some embodiments, the BP node can perform MP node functions.

FIG. 5C illustrates the communication network 100 forwarding data packets on a merged path when the protected link fails. In particular, FIG. 5C shows that the link A-C has failed. Once the link A-C fails, node A activates FRR forwards data packets on the backup path (i.e., label 32). Node A, once FRR is activated, further stops forwarding data packets on the primary path (i.e., label 30). Node B forward data packets with labels 40 and 43 towards node E and node C, respectively. No change occurs at node E since node E receives data packets with label 40 as usual. Node C receives the data packets from node B (i.e., label 43) and forwards data packets with label 41. No change occurs at node F since node F receives data packets with label 41 as usual. Subsequently, a head-end node (not shown) can setup a new primary tree after re-optimization and switch over the traffic thereby preventing duplication.

With respect to RSVP messaging and stitching the primary path to the backup path, the PLR node (e.g., node A), can trigger determine that the backup tree has at least the portion of overlap with the primary tree for each node sharing an upstream path relative to a merge point (MP) node toward itself (e.g., the PLR node). The PLR node can further trigger a notification down the backup tree to indicate that the primary tree and the backup tree have at least the portion of overlap to cause each node of the portion of overlap to stitching the backup tree to the primary tree. Notably, a backup label can indicate to the MP node that packets received with a backup label should be switched along the primary path (e.g., a P2MP LSP path). Importantly, a different backup label is used than the primary label so as to prevent duplication of traffic. At the MP node, the backup path (e.g., a source-to-leaf (S2L) sub-LSP) is merged with the primary path. Typically, the PLR node does not tear down the primary path on the links that are unrelated to a failure. Additionally, the PLR can track the replication set (e.g., links and labels) so as to avoid sending duplicate traffic to a backup node (BP or MP).

In other embodiments, a multicast label distribution protocol (mLDP) can be used to stitch the backup path to the primary path for a protected link. In these embodiments, the MP node sets up a backup path to the PLR node. For example, referring again to FIG. 5B, node A is the PLR node and node C is the MP node. To protect the A-C link, node C can determine a link-protecting per-prefix loop free alternative (LFA) for PLR node A—here node B. Node C can then signal, via mLDP on the LFA path, for each node to set up a backup path (e.g., a P2MP LSP path) with A being the root. This will result in a backup path of nodes C-B-A. Node C can further convey to node B and node A that the backup LSP should be stitched to the primary LSP (e.g., via a forwarding equivalent class (FEC) object). As shown in FIG. 5B, node C creates label mapping with incoming label 43 mapped to outgoing label 41 and node B creates a label mapping with incoming label 32 mapped to outgoing label 43. Node A receives node B label mapping for backup and performs a check to determine if node B is already on primary tree. If yes, node A can creates a new FRR LFIB entry for the backup LSP (e.g., mapping an incoming label mapped to outgoing label=32). Subsequently, node A (e.g., the PLR node) can notify nodes B and C that backup tree shares the path with primary tree. This notification is sent down the backup tree, causes node B to create the LFIB entry with incoming label 32 mapped to outgoing label=43, 40; and node C to create the LFIB entry with incoming label 43 mapped to outgoing label 41. As discussed above, when A-C link fails, node A activates FRR and starts forwarding on the backup P2MP LSP (with label 32) and the backup path is used by subsequent nodes for data packet forwarding.

Figure 6A:
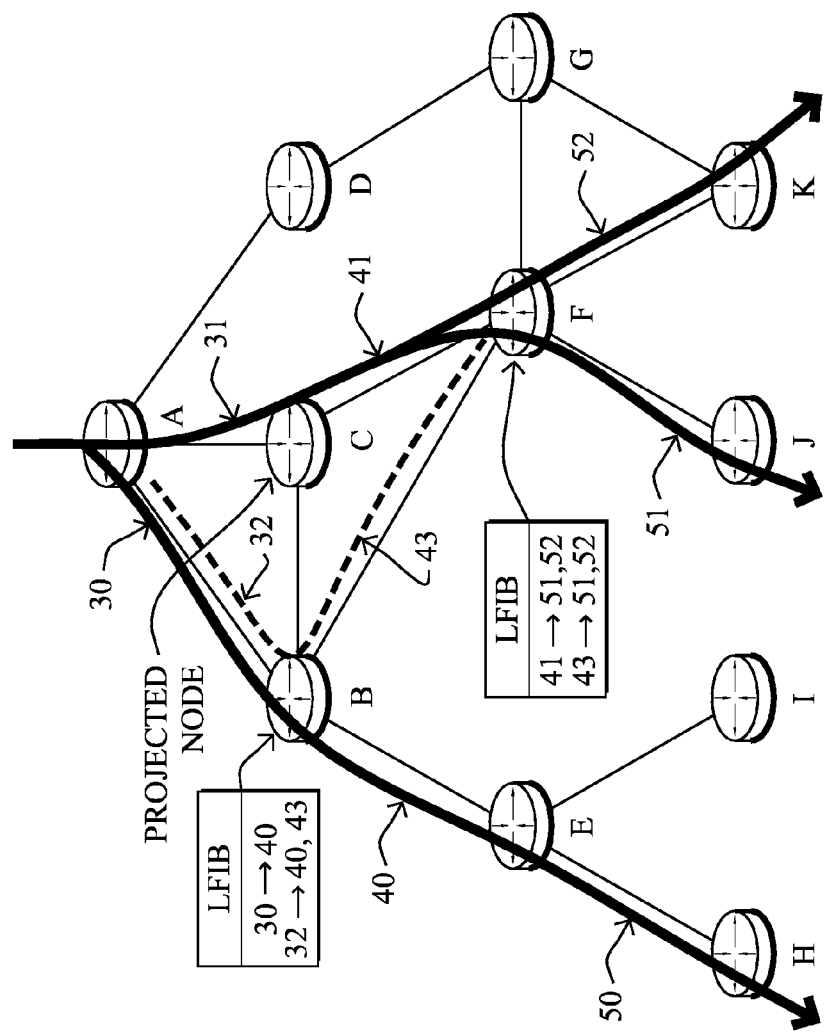
FIGS. 6A-6B illustrate an example view of the communication network of FIG. 1 with respect to merge processes for a protected node.
Figure 6B:
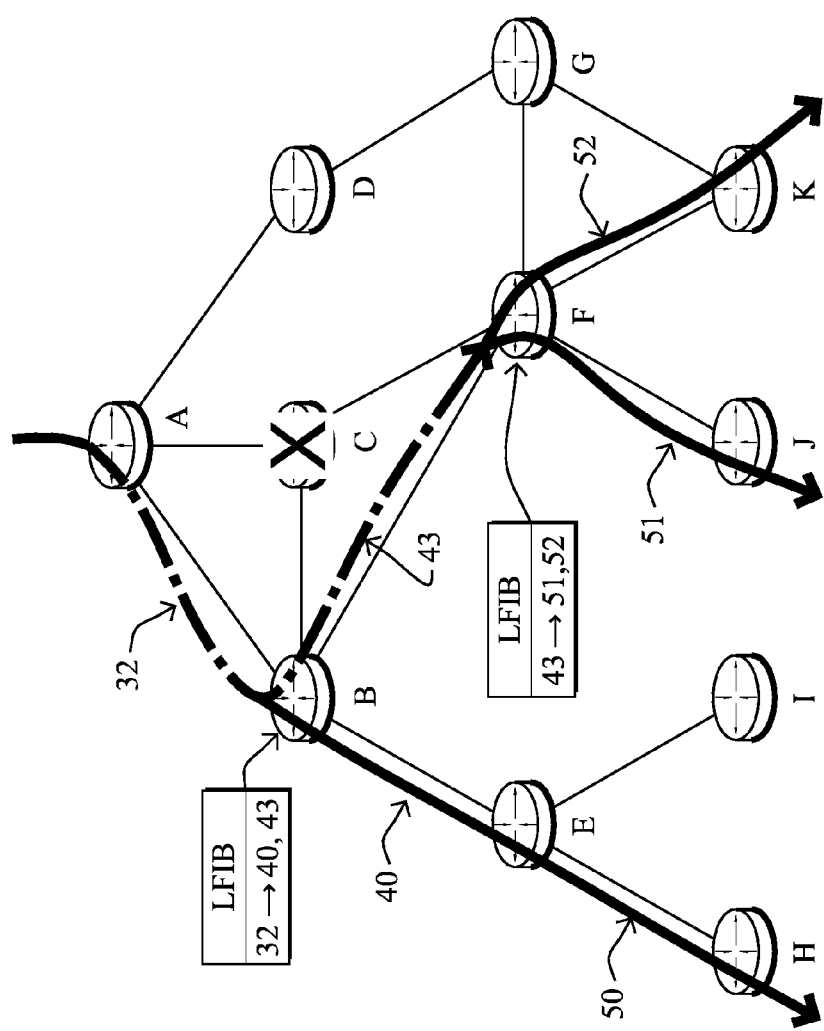

In some embodiments, as discussed above, a node can be protected. For example, FIGS. 6A-6B illustrate an example view of the communication network of FIG. 1 with respect to merge processes for a protected node (i.e., node C). To protect node C, node A sets up an n-hop backup path (i.e., via nodes A-B-F). A conveys to node B and node F that the backup tunnel should be stitched to the primary tunnel (e.g., via an RSVP message). In turn, node B creates an additional LFIB entry with incoming label 32 mapped to outgoing labels 40 and 43. Node F creates an additional LFIB entry with incoming label 43 mapped to outgoing labels 51 and 52.

FIG. 6B illustrates the communication network 100 forwarding data packets on a merged path when the protected node fails. As shown, when node C fails, node A activates FRR and forwards data packets on the backup path (i.e., label=32). Node A further stops forwarding data packets on the primary path once FRR is activated. Node B receives data packets with label 32 and forwards the data packets with label 40 and 43 to node E (on the primary path) and F (on the continuing backup path), respectively. No changes occur at node E since node E receives data packets with label 40 as usual. Node F receives data packets with label 43 and forwards the data packets with label 51 and 52 to nodes J and K, respectively. Subsequently, a tunnel head-end node (not shown) can setup a new primary path due to re-optimization and switch traffic over without duplication. As shown, node A is a PLR node that can clean up the backup tunnel.

In other embodiments, a multicast label distribution protocol (mLDP) can be used to stitch the backup path to the primary path for a protected node. In these embodiments, MP node F determines a backup path to bypass protected node C (e.g., a per-prefix LFA for node C). Node F then sets up the backup path (e.g., FEC) via nodes F-B-A with node A being root. Node F conveys to node B and node A that the backup LSP should be stitched to the primary path. In response, node B creates an additional LFIB entry with incoming label 32 mapped to outgoing label 40 and 43; and node F creates an additional LFIB entry with incoming label 43 mapped to outgoing label 51 and 52. As discussed above, when node C fails, node A activates FRR forwards data packets on the backup path (with label 32); node B forwards with label 40 and 43 towards E and F, respectively; and node F forwards with label 51 and 51.

Figure 7A:
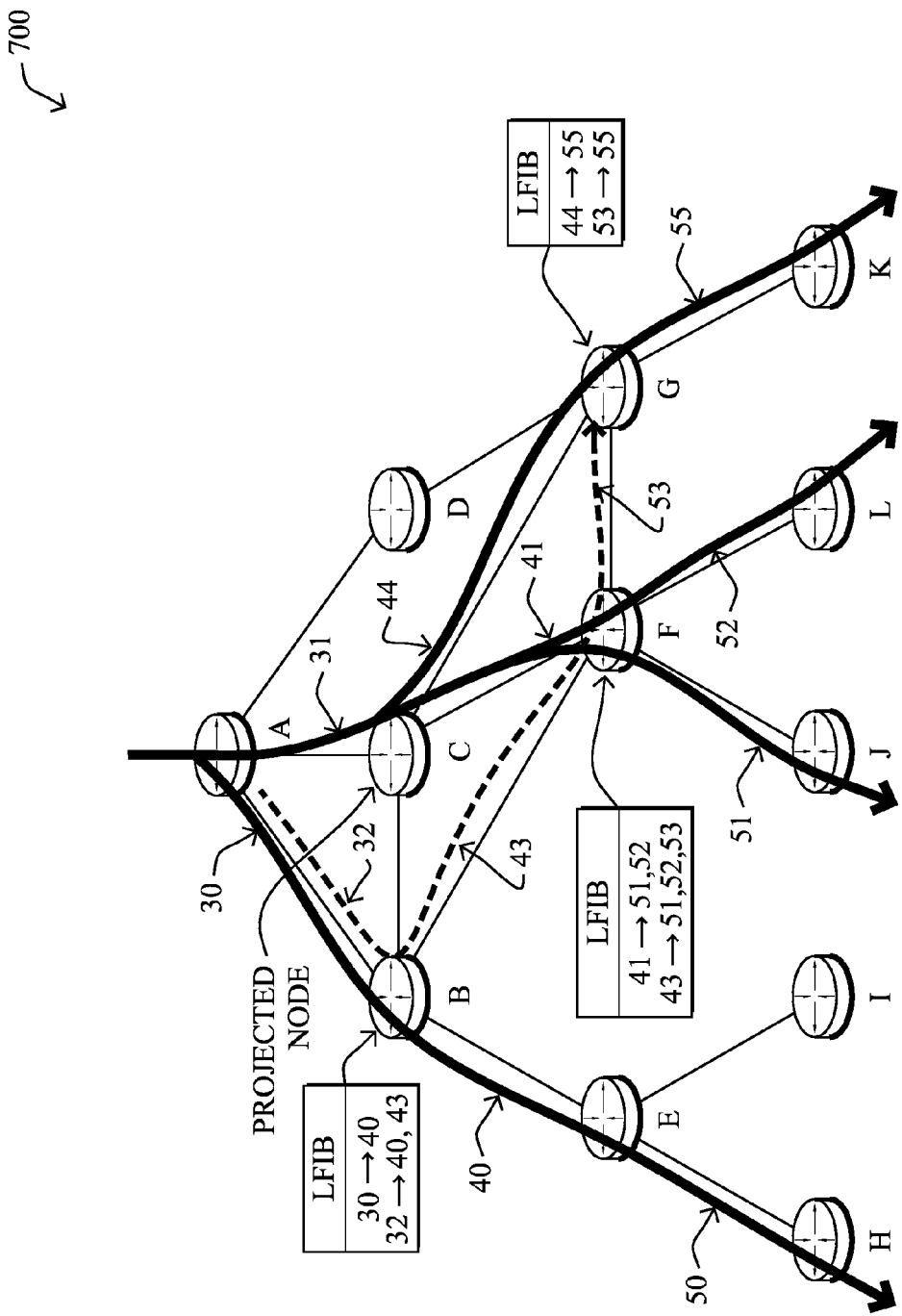
FIGS. 7A-7B illustrate another example view of the communication network of FIG. 1 with respect to merge processes for a protected node.
Figure 7B:
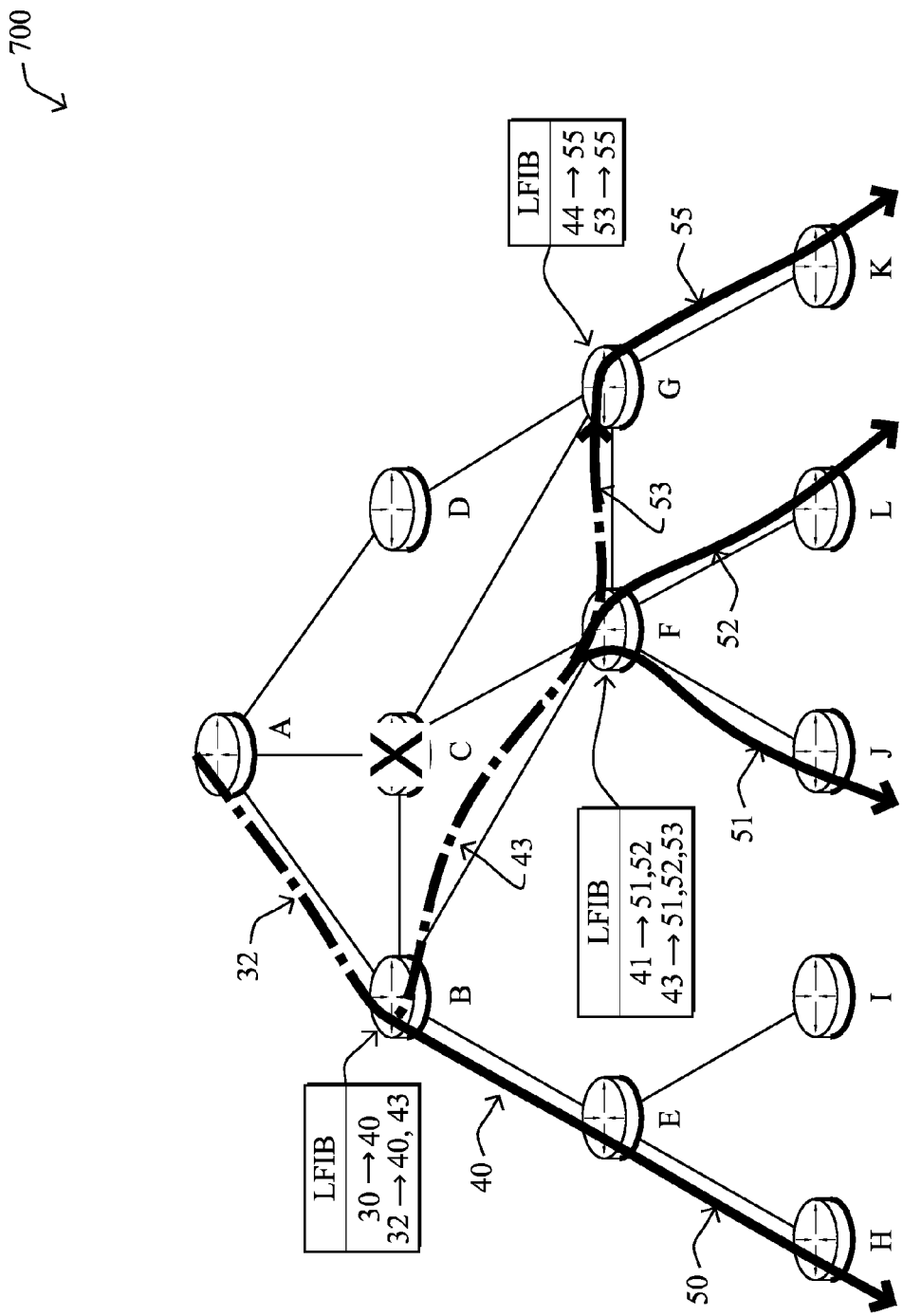

FIGS. 7A-7B illustrate another example view of the communication network of FIG. 1 with respect to merge processes for a protected node. For example, FIG. 7A illustrates another example communication network (i.e., 700) that also forwards messages according to tunnels. In particular, network 700, similar to network 100 discussed above, includes various nodes/devices (e.g. labeled as shown, "A"-"L") interconnected by various methods of communication (e.g., links). Data packets are sent amongst the various nodes in network 700 via, for example, tunnels (e.g., a P2MP tunnel, etc.). As shown, node A normally forwards data packets to nodes B and C using label 30 and 31, respectively. Node C is a protected node, which is bypassed via a backup path or tunnel A-B-F-G. As discussed above, node A can, for example, convey to nodes B,F,G that the backup tunnel should be stitched to the primary tunnel (e.g., via an RSVP attribute). In turn, nodes B, F, and G create LFIB entries as follows: node B creates an additional LFIB entry with incoming label 32 mapped to outgoing label 40 and 43; F creates an additional LFIB entry with incoming label 43 mapped to outgoing labels 51, 52 and 53; node G creates an additional LFIB entry with incoming label 53 mapped to outgoing label 55.

FIG. 7B illustrates the communication network 700 forwarding data packets on a merged path when the protected node fails. Similar to the above-discussed node failure with respect to network 100, when node C fails, node A activates FRR and forwards data packets on the backup path (i.e., label 32). Node A further stops forwarding data packets on the primary path once FRR is activated. Node B receives data packets with label 32 and forwards the data packets with label 40 and 43 to node E and F, respectively. No changes occur at node E since node E receives data packets with label 40 as usual. Node F receives data packets with label 43 and forwards the data packets with label 51, 52, and 53 to nodes J, K, and G, respectively.

Accordingly, the embodiments disclosed herein provide for local protection techniques that can include, for example, local protection for P2MP LSPs. Such techniques can provide one backup P2MP tree/LSP per primary P2MP tree/LSP independent of number of receivers/tail-ends. Further, these techniques provide logic to merge backup LSPs with primary LSPs using just the forwarding state (e.g., RSVP and mLDP). With respect to mLDP, an mLDP enhancement can signal the backup P2MP LSP from MP to PLR and with respect to RSVP, a RSVP enhancement can signal the backup P2MP LSP from PLR to MP. These techniques further provide logic that treats backup LSP as the primary sub-LSP on common paths during FRR and after reoptimization, as necessary.

Figure 8:
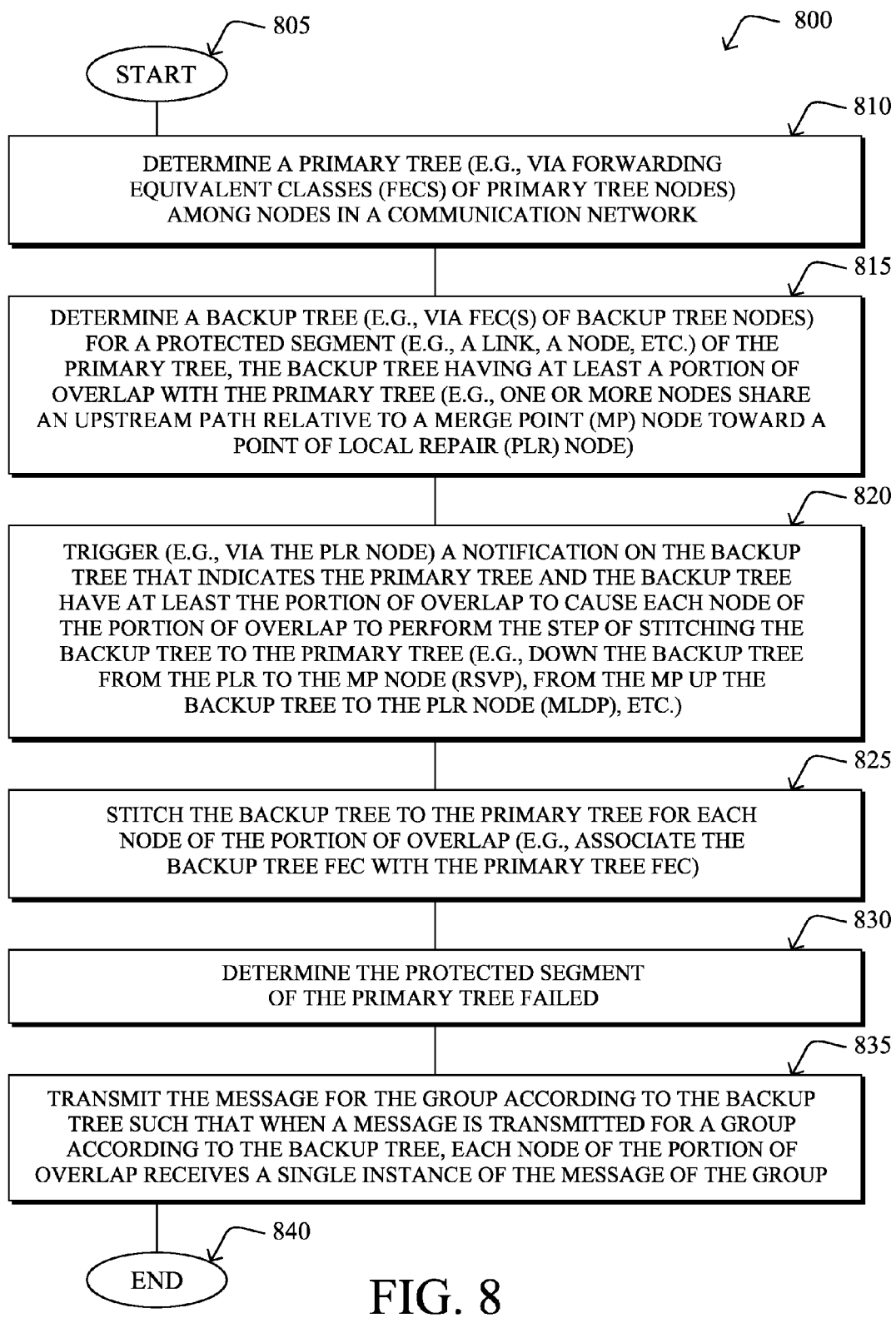
FIG. 8 illustrates an example simplified procedure for providing local protection for devices in a communication network.

FIG. 8 illustrates an example simplified procedure 800 for providing local protection for devices in a communication network. In particular, the example simplified procedure 800 provides steps for merging a backup tree with a primary tree in a communication network in accordance with one or more embodiments described herein. The procedure 800 may start at step 805, and continues to step 810, where, as described in greater detail above, a node can determine a primary tree (e.g., via forwarding equivalent classes (FECs)) among nodes in a communication network. Next, in step 815, the procedure can determine a backup tree (e.g., via FECs of backup tree nodes) for a protected segment (e.g., a link, a node, etc.) of the primary tree. Notably, the backup tree can have at least a portion of overlap with the primary tree (e.g., one or more nodes share an upstream path relative to a merge point (MP) node toward a point of local repair (PLR) node). Once the backup tree and the primary tree are determined, one of the nodes (e.g., a PLR node) can trigger a notification on the backup tree in step 820. The notification can indicate that the primary tree and the backup tree have at least the portion of overlap, which can cause each node of the portion of overlap to perform the step of stitching the backup tree to the primary tree. For example, as discussed above, such triggering can notify nodes down the backup tree from the PLR to the MP node (e.g., via RSVP), or alternatively, such triggering can notify nodes from the MP up the backup tree to the PLR node (e.g., via mLDP). Next, in step 825, the backup tree can be stitched to the primary tree for each node of the portion of overlap. For example, each node of the portion of overlap can associate the backup tree forwarding equivalent class (FEC) with the primary tree FEC. For example, the backup tree can be stitched to the primary tree for each node of the portion of overlap by creating a new label forwarding information base (LFIB) definition for the backup nodes (e.g., nodes that bypass the protected segment of the primary tree). Such LFIB entries can map incoming labels of the new LFIB definition to one or more previously known outgoing label portions. Process 800 continues to step 830 where a protected segment of the primary tree fails. Subsequently, in step 835, the message for the group is transmitted according to the backup tree as described in greater detail above, such that messages transmitted for a group according to the backup tree are received once at each overlapping node (that is, each node of the portion of overlap receives a single instance of the message of the group). Process 800 can subsequently end in step 840, or can restart at step 805 where a primary tree is determined among nodes in a communication network.

It should be noted that while certain steps within procedures 800 may be optional, the steps shown in FIG. 8 is merely an example for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide a simple approach to provide link/node protection using primary and backup trees built by the same protocol. Such techniques may avoid unnecessary bandwidth usage due to merging backup and primary tree during FRR. In particular, for mLDP, these techniques provide an optimal Switch-Before-Break (SBB) mechanism, where the PLR node controls moving to and from the backup tree. This helps in avoid additional traffic loss/duplication due to link delay and buffering.

While there have been shown and described illustrative embodiments that provide for dynamic enabling of routing devices in a shared-media communication network, it is to be understood that various other adaptations and modifications may be made within the spirit and scope of the embodiments herein. For example, the embodiments have been shown and described herein with relation to multicast networks. However, the embodiments in their broader sense are not as limited, and may, in fact, be used with other types of communication networks and/or protocols. In addition, while certain protocols are shown, such as mLDP and RSVP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining a primary tree among nodes in a communication network;
   determining a backup tree for a protected segment of the primary tree, the backup tree having at least a portion of overlap with the primary tree; and
   stitching the backup tree to the primary tree for each node of the portion of overlap such that when a message is transmitted for a group according to the backup tree, each node of the portion of overlap receives a single instance of the message of the group, wherein stitching includes:
      creating a new label forwarding information base (LFIB) definition for at least one node that bypasses the protected segment of the primary tree; and
      mapping an incoming label portion of the new LFIB definition to at least one or more previously known outgoing label portions of the one node.

2. The method of claim 1, wherein determining the backup tree for the protected segment of the primary tree comprises determining the backup tree has at least a portion of overlap with the primary tree for one or more nodes sharing an upstream path relative to a merge point (MP) node toward a point of local repair (PLR) node, the method further comprising:
   triggering, via the PLR node, a notification down the backup tree that indicates the primary tree and the backup tree have at least the portion of overlap to cause each node of the portion of overlap to perform the step of stitching the backup tree to the primary tree.

3. The method of claim 1, further comprising:
   triggering, via a merge point (MP) node, a notification transmission on the backup tree toward a point of local repair (PLR) node that indicates the primary tree and the backup tree have at least a portion of overlap to cause each node of the portion of overlap to perform the step of stitching the backup tree to the primary tree.

4. The method of claim 1, wherein the protected segment of the primary tree comprises at least one of a protected link and a protected node.

5. The method of claim 1, wherein determining the primary tree among nodes in the communication network comprises determining a forwarding equivalent class (FEC) of the primary tree, and wherein determining the backup tree for the protected segment further comprises determining a FEC of the backup tree, wherein stitching the backup tree to the primary tree for each node of the portion of overlap comprises associating the FEC of the primary tree with the FEC of the backup tree.

6. The method of claim 1, further comprising:
determining the protected segment of the primary tree failed, and transmitting the message for the group according to the backup tree using a multicast label distribution protocol (mLDP).

7. The method of claim 1, wherein the primary tree and the backup tree are MultiProtocol Label Switching Label Switched Paths (MPLS LSPs).

8. An apparatus, comprising:
one or more network interfaces to communicate one or more nodes in a communication network;
a processor coupled to the network interfaces and adapted to execute one or more processes; and
a memory configured to store a process executable by the processor, the process when executed operable to:
determine a primary tree among nodes in a communication network;
determine a backup tree for a protected segment of the primary tree, the backup tree having at least a portion of overlap with the primary tree; and
stitch the backup tree to the primary tree for each node of the portion of overlap such that when a message is transmitted for a group according to the backup tree, each node of the portion of overlap receives a single instance of the message of the group, wherein the stitching process includes:
creating a new label forwarding information base (LFIB) definition for at least one node that bypasses the protected segment of the primary tree; and
mapping an incoming label portion of the new LFIB definition to at least one or more previously known outgoing label portions of the one node.

9. The apparatus as in claim 8, wherein the apparatus is a merge point node, the process when executed is further operable to:
trigger a notification transmission on the backup tree toward a point of local repair (PLR) node that indicates the primary tree and the backup tree have at least a portion of overlap to cause each node of the portion of overlap to perform the step of stitching the backup tree to the primary tree.

10. The apparatus as in claim 8, wherein the protected segment of the primary tree comprises at least one of a protected link and a protected node.

11. The apparatus as in claim 8, wherein the apparatus is a merge point node, the process when executed is further operable to:

determine the protected segment of the primary tree failed, and
transmit the message for the group according to the backup tree using a multicast label distribution protocol (mLDP).

12. The apparatus as in claim 8, wherein the primary tree and the backup tree are MultiProtocol Label Switching Label Switched Paths (MPLS LSPs).

13. A tangible, non-transitory, computer-readable media having software encoded thereon, the software when executed by a processor operable to:
determine a primary tree among nodes in a communication network;
determine a backup tree for a protected segment of the primary tree, the backup tree having at least a portion of overlap with the primary tree; and
stitch the backup tree to the primary tree for each node of the portion of overlap such that when a message is transmitted for a group according to the backup tree, each node of the portion of overlap receives a single instance of the message of the group, wherein the stitching process includes:
creating a new label forwarding information base (LFIB) definition for at least one node that bypasses the protected segment of the primary tree; and
mapping an incoming label portion of the new LFIB definition to at least one or more previously known outgoing label portions of the one node.

14. The computer-readable media as in claim 13, wherein the software when executed is further operable to:
trigger a notification transmission on the backup tree toward a point of local repair (PLR) node that indicates the primary tree and the backup tree have at least a portion of overlap to cause each node of the portion of overlap to perform the step of stitching the backup tree to the primary tree.

15. The computer-readable media as in claim 13, wherein the protected segment of the primary tree comprises at least one of a protected link and a protected node.

16. The computer-readable media as in claim 13, wherein the software when executed is further operable to:
determine the protected segment of the primary tree failed; and
transmit, in response to the failure, the message for the group according to the backup tree using a multicast label distribution protocol (mLDP).

17. The computer-readable media as in claim 13, wherein the a primary tree and the backup tree are MultiProtocol Label Switching Label Switched Paths (MPLS LSPs).

* * * * *